Aug. 26, 1924.

A. A. VARDELL ET AL 1,506,268

MECHANICAL SEED SEPARATOR

Filed Oct. 14, 1920  4 Sheets-Sheet 1

Inventors
A. A. Vardell
J. W. Stribling

By Jack L. Ashley
Attorney

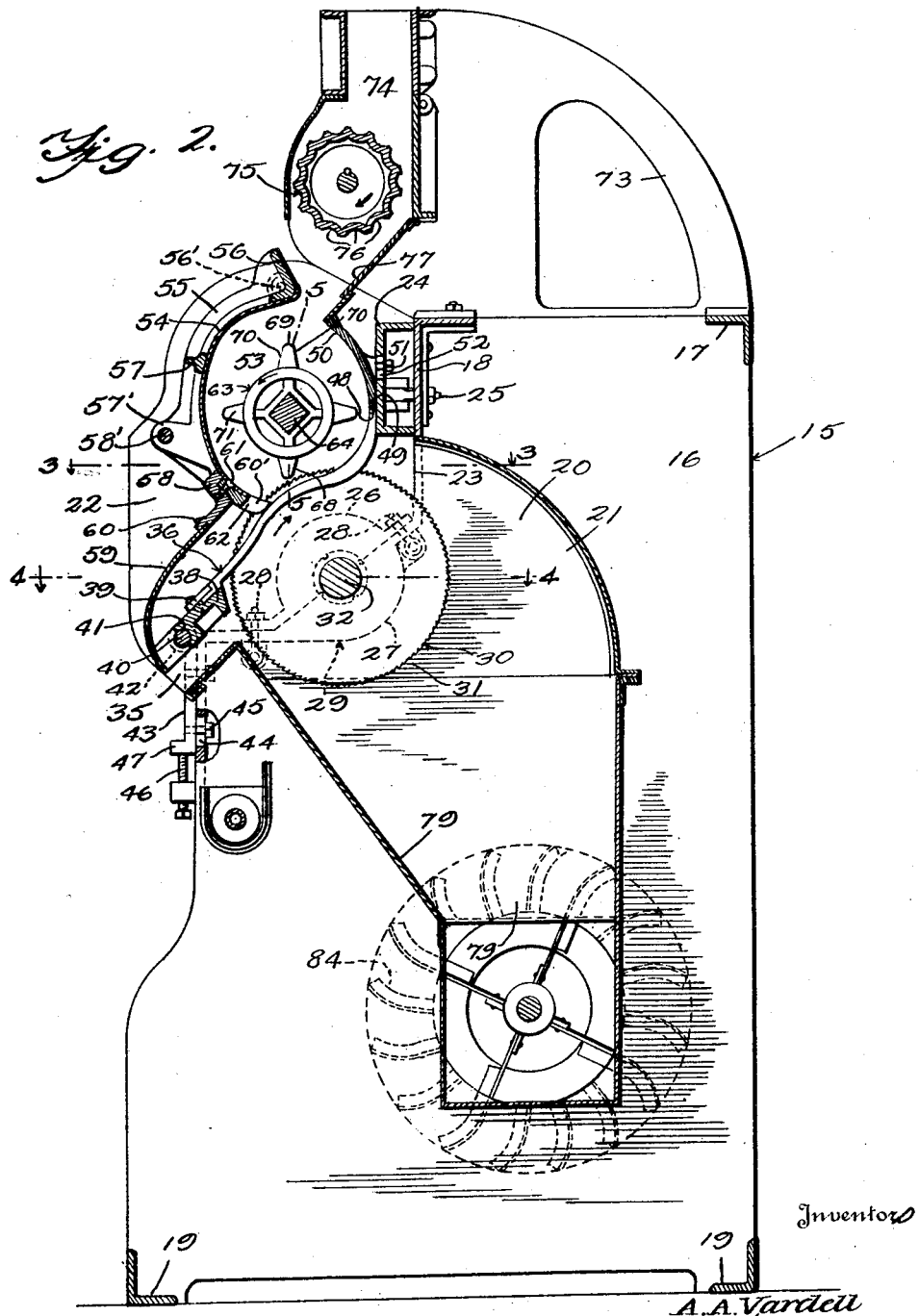

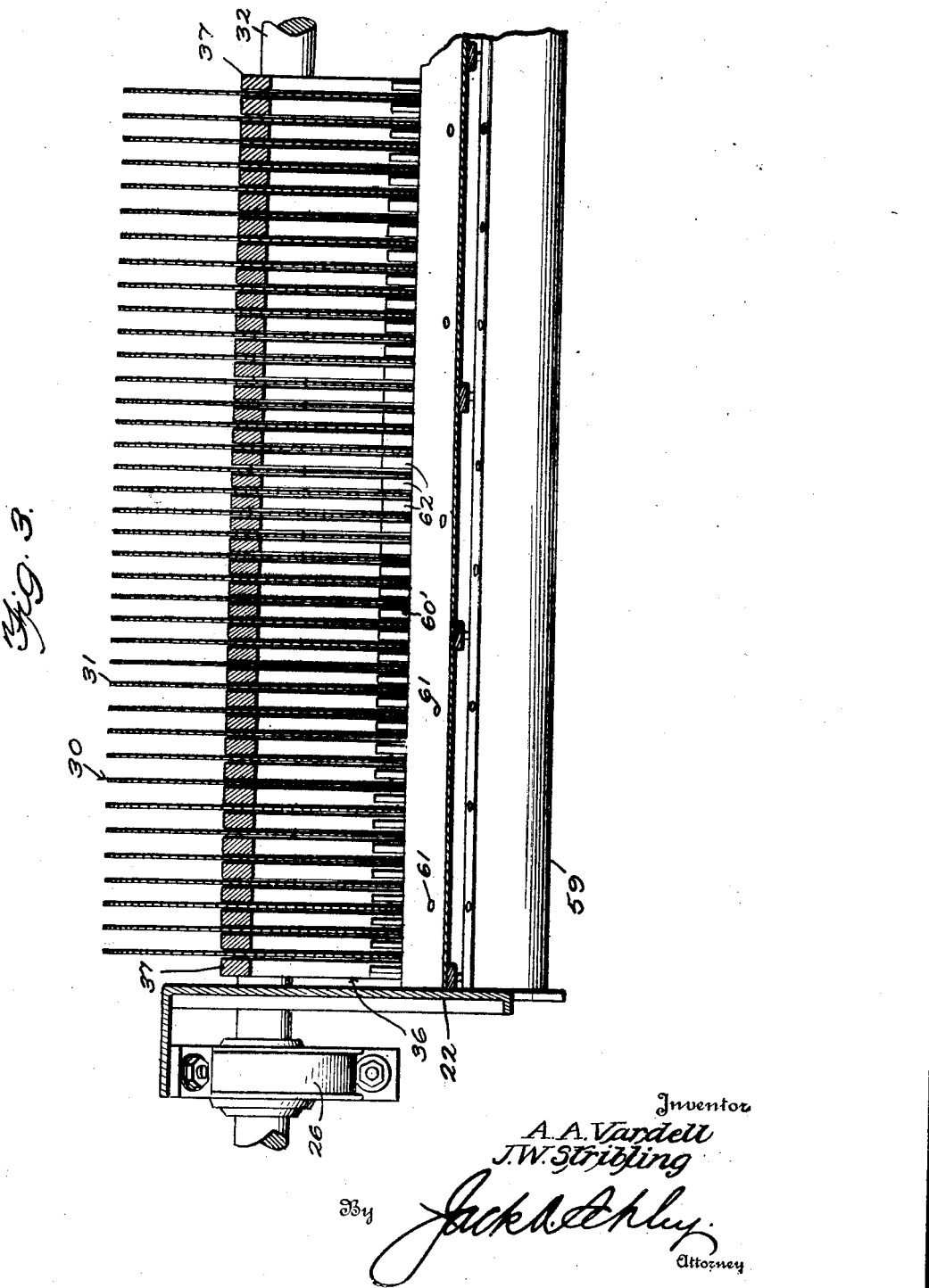

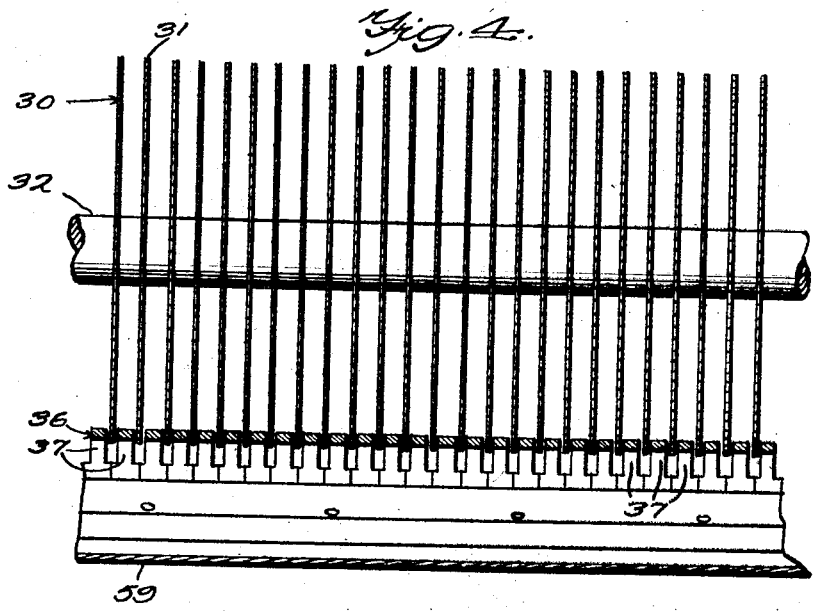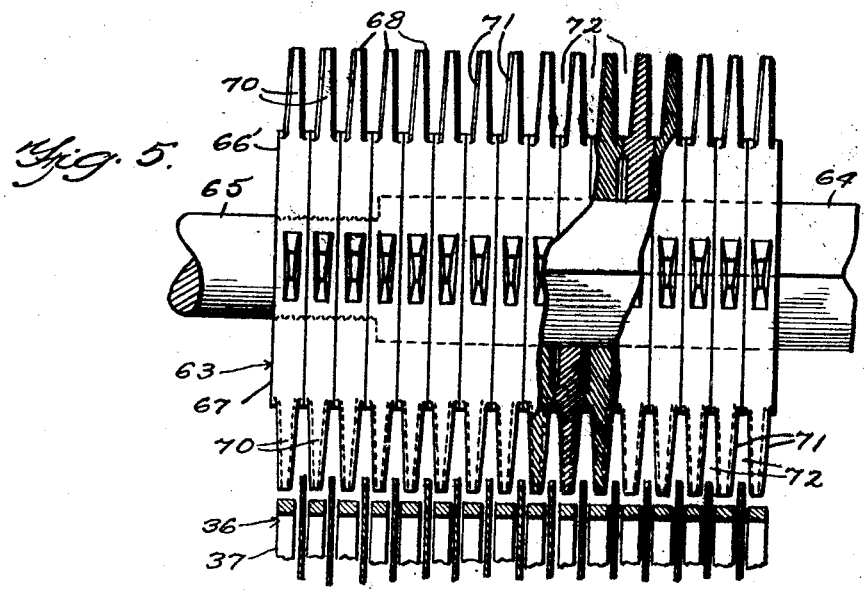

Patented Aug. 26, 1924.

1,506,268

UNITED STATES PATENT OFFICE.

ARTHUR A. VARDELL, DECEASED, LATE OF DALLAS, TEXAS; BY HIGHLAND G. VARDELL, EXECUTRIX, OF DALLAS, AND JAMES WYATT STRIBLING, OF ENNIS, TEXAS.

MECHANICAL SEED SEPARATOR.

Application filed October 14, 1920. Serial No. 416,939.

*To all whom it may concern:*

Be it known that we, HIGHLAND G. VARDELL, executrix of ARTHUR A. VARDELL, deceased, and JAMES WYATT STRIBLING, citizens of the United States of America, residing, respectively, at Dallas, Dallas County, and State of Texas, and Ennis, Ellis County, and State of Texas, herewith set forth certain new and useful Improvements in Mechanical Seed Separators, of which the following is a specification.

This invention relates to new and useful improvements in mechanical cotton seed and hull separators and has for its principal object the recovery of whole or uncut seeds by mechanically separating the hulls and lint therefrom.

In converting cotton seed into the various products in connection with the oil mill industry, said seed goes thru several processes, one of which comprises the two separate and distinct steps of first hulling in an ordinary cotton seed huller and second separating the whole or uncut seed from the hulls and other foreign matter. The reason for the separation is that a portion of the seeds will pass thru the huller without being hulled and would be lost if not carried back to the huller and hulled.

After the seeds have been passed thru the huller they are taken thru a system of shakers and beaters, whereby the kernels or meats are separated or removed and this leaves a mass composed principally of whole or uncut seeds and hulls which latter are sometimes referred to as cut hulls, in this mass will be some particles of foreign matter which, however, has little to do with the invention.

Our invention has particularly to do with a machine for handling the mass of hulls and whole seeds after the kernels have been removed, whereby the whole seeds may be separated out and recovered. By the use of such a machine it is possible to obtain better results in the huller by doing coarser work, which does not cut up the meats as much as where fine work is done; however, coarse work in the huller means that more whole seeds will pass out of the huller uncut, probably from five to ten per cent.

Various means have been employed for carrying out such a separation but there are many objections.

The object of the invention, therefore, is to provide a mechanical separator which will act to separate the hulls from the whole seeds and one of the principal objects is to provide means for forming or pressing the mass of hulls and seeds which are delivered to the machine, into a dense rotating body, which is brought into proper contact with rapidly rotating saws, operating in conjunction with a suitable grate and a comb, whereby the hulls are separated from the whole or uncut seeds and small particles are removed.

A further object of the invention is to provide means for conveying the separated hulls to a grinding mill or the like, by means of an air blast, thereby avoiding the liability of solid parts, such as nuts and bits of metal and stone being passed thru the mill.

A further object of the invention is to provide a machine of the above mentioned character, which is economical in floor space, as well as power to drive the same.

Another object of the invention is to provide means for introducing an incoming blast of air, impinging upon the teeth of the saw cylinder, rotating across or in an opposite direction to the blast, thereby serving to remove from the teeth material not thrown therefrom by centrifugal force.

A construction designed to carry out the invention will be hereinafter described together with other features of the invention.

The invention will be more readily understood from a reading of the following specification and by reference to the accompanying drawings, in which an example of the invention is shown and wherein:

Fig. 2 is a central vertical section taken on line 2—2 of Fig. 1,

Fig. 3 is a horizontal section taken on line 3—3 of Fig. 2,

Fig. 4 is a similar view taken on line 4—4 of Fig. 2,

Fig. 5 is a vertical section taken on line 5—5 of Fig. 2, the rotatable presser being in elevation, with parts broken away.

Figure 1:
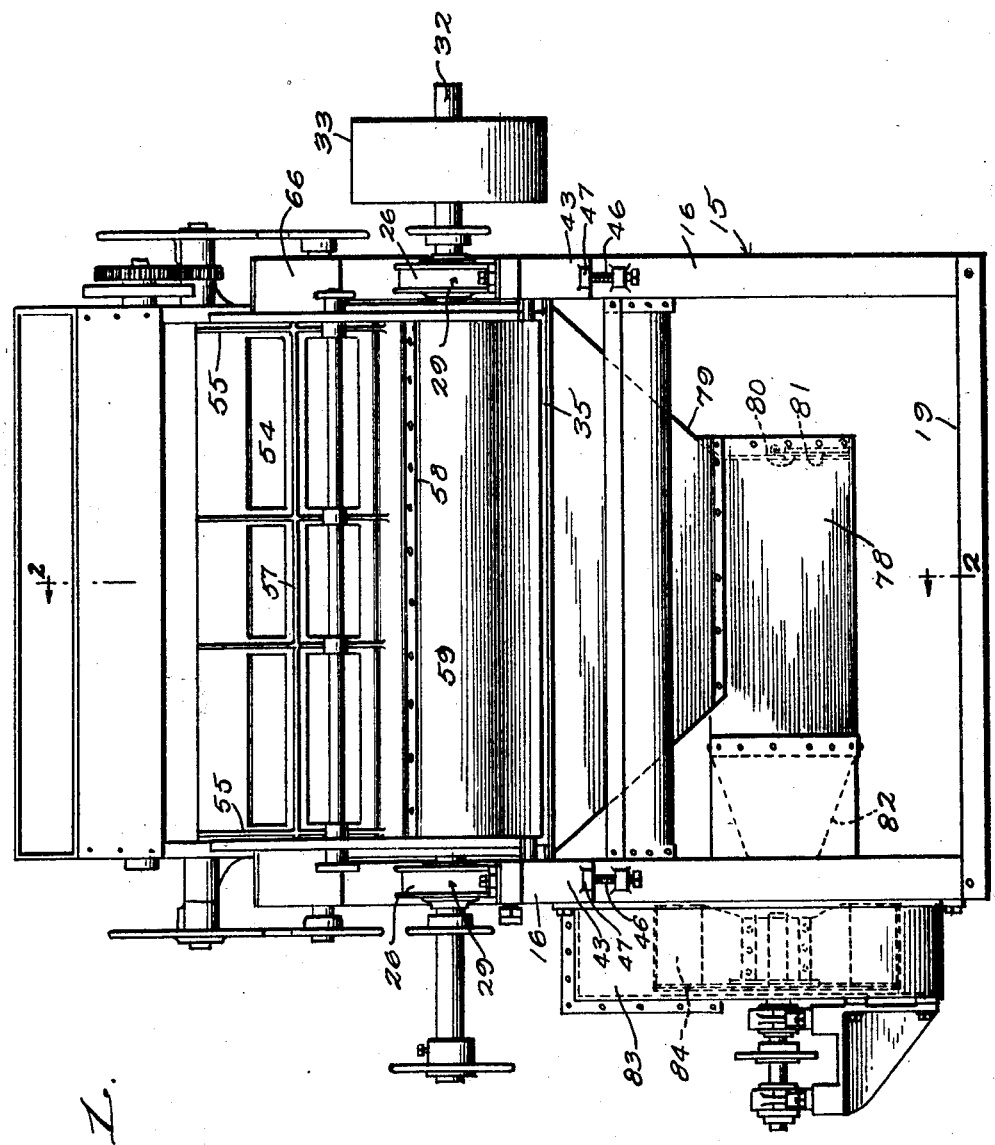
Fig. 1 is a front elevation of a machine embodying my invention.

In the drawings, the numeral 15 designates a pair of side frame members, embodying plates 16. These members are connected by upper and lower horizontal bars 17, 18 and 19, as shown.

Arranged within the upper portion of the frame is a saw chamber 20, the ends of which are closed by the plates 16. This chamber includes an upper rear wall 21, preferably curved, as shown. The numeral 22 designates heads, the lower portion of which form an air tight engagement with the member 16, at 23, and these heads form a portion of the ends of the saw chamber 20. The heads 22 are rigidly secured, near their upper ends, with a transverse rail 24, secured to the bar 18, by bolts 25, as shown. The heads 22, near their lower ends, carry the upper parts 26 of bearings, the lower parts 27, being formed upon the members 16. These parts 26 and 27 are connected by bolts 28. The parts 26 and 27 constitute a bearing 29.

The numeral 30 designates a saw cylinder as a whole, embodying a plurality of circular saws 31, rigidly mounted upon a shaft 32, journaled through the bearings 29. These saws are equidistantly spaced, as shown, and the shaft 32 receives its rotation from a pulley 33, as shown. The saw cylinder is rotated in the direction of the arrow, in Fig. 2.

It might be well to state at this point that the heads 22 are connected by suitable means and that the saw cylinder is therefore enclosed, except for a longitudinal opening 35, provided for an incoming blast or current of air. The air entering through the opening 25, travels across or in an opposite direction to the rotation of the saws, as the same is induced by a fan, to be described, arranged beneath the saw. The function of this current of air is to remove the material by the teeth of the saw, which has not been thrown therefrom, by centrifugal force.

The numeral 36 designates a grate as a whole, including spaced ribs 37, preferably curved, as shown. The saws 31 extend between the ribs and also spaced therefrom on each side to permit suitable passages for the travel of the cut hulls therebetween, but the passages are not sufficiently large for the passage of the whole seed. At their lower ends, the ribs 37 are secured to a rail 38, by screws 39 or the like. This rail is preferably vertically adjustably supported by a horizontal rod 40, fitting within a recess 41. The rod 40 is held within eyes 42, upon bars 43. These bars contact with the edges of the member 16, which may be slotted, at 44, to receive clamping bolts 45, engaging the bars. The bars 43 may be elevated by bolts 46, engaging lugs 47, formed upon the members 16. The upper ends of the bars rest upon the rail 24, and have extensions 48, to engage end of recesses 49, formed in a concave-back 50, which may be attached to the rail 24 by bolts 51, operating within slots 52, should it be desired to vertically adjust the concave-back. The concave-back forms the inner side of a roll-box 53, having an outer wall 54, which may be formed of sheet metal, secured upon a frame-work, embodying curved upright end members 55, connected by horizontal bars 56, 57 and 58, as shown. The end members 55, at their tops, are connected with the frame members or heads 22, by bolts 56', and these end members also carry apertured ears 57', receiving a horizontal rod 58', secured to the heads 22.

The bar 58 carries an apron 59, secured thereto at 60, and extending over the ribs 37, for completely inclosing the saws, except for the opening 35.

The bar 58 carries a comb 60', attached thereto by screws 61 or the like. This comb includes spaced teeth 62, projecting inwardly beyond the teeth of the saws, and preferably contacting with the ribs 37. In the central portion of the comb, the teeth 62 are spaced closer together and hence the whole seed cannot pass therebetween, but toward the ends of the comb the spaces between the teeth increase, so that the whole seed, will gradually work toward such ends, and hence be discharged from the machine. The purpose of this will be hereinafter pointed out.

The numeral 63 designates a rotatable presser cylinder, as a whole, embodying a rotatable shaft 64, extending eccentrically within the roll-box 53, and arranged near the lower portion thereof. This shaft is square in cross section and has circular ends 65, journaled in bearings 66. The rotatable presser cylinder embodies a plurality of disks 63, having hubs 67, provided with openings, which are square in cross section, to receive the shaft 64. The disks are closely assembled to form a cylinder, and are provided upon their peripheries with radially extending and tapering presser fingers 68, preferably formed in longitudinal groups, as shown. The fingers 68, in the same group, are spaced, to form wedge shaped pockets which receive therebetween the teeth of the saws 30, such fingers passing in close proximity to the ribs 37. The specific construction of these fingers is important, and they taper outwardly to rounded ends 69, forming inclined faces 70, this producing tapered or wedged spaces between the sets of fingers. In addition to the tapered faces 70, the side faces 71 of the fingers are inclined or tapered, and converge toward the forward edge of the same, or in the direction of rotation of the presser cylinder, forming spaces 72, which are tapered or wedge-shaped, increasing in width forwardly. The shaft 64 is driven in the direction of the arrow, by any suitable means.

The numeral 73 designates upper frame extensions, which are bolted to the frame members 16, and a feed hopper 74 is formed therein, for receiving the material to be treated. Within the lower portion of the feed hopper, is a rotatable feed wheel 75, having pockets 76. The feed wheel is driven in the direction of the arrow, at a suitable speed, and discharges the seed, intermittently, upon an incline 77, from which it passes into the roll-box 53.

Arranged beneath the saw chamber 20 is a horizontal trunk 78, having an opening 79 in its top, for receiving the lower reduced end of a tapered discharge chute 79, connected with the saw chamber 20. At one end of the trunk 78 is an opening 80, for the inlet of air, the extent of which is varied by a slide valve 81. The opposite end of the trunk is connected with a suction fan casing 83, having a rotary fan 84 therein. A conical guard 82 is arranged in the trunk 78. The outlet side of this fan casing is adapted for connection with a conduit or trunk, which leads to a grinding mill, for receiving the hulls. Should any solid articles, such as portions of the machine, become broken and fed over with the hulls, the same will be collected in the trunk 78, and not pass to the mill.

The operation of the machine is as follows:

The saw cylinder 30 is driven in the direction of the arrow, but at a higher speed than the presser cylinder 63, driven in the direction of its arrow. The fan 84 is driven at a suitably high speed, in the direction of the arrow. The rotatable feed wheel 75, rotates in the direction of its arrow, but slower than the presser cylinder.

The material which comes to the machine consists of whole or uncut seeds, hulls, lint and some foreign matter and particles and is easily formed into a matted roll.

This material is spread by the wheel 75 and fed into the roll-box 53. The material is taken up by the revolving presser cylinder, and by virtue of the peculiar shape and arrangement of the tapered fingers 68, said material is formed into a compressed or condensed roll, revolving with the presser cylinder. The formation of this roll is also aided by the eccentric arrangement of the presser cylinder with relation to the roll-box. The rotating roll of the material, is moved into contact with the upper portions of the revolving saws 31, rotating at a high speed, the fingers 68 extending between the teeth saws. It is particularly pointed out that the flared pockets formed by the side faces 71 of the fingers 68 will gather the material and force it down upon the saw teeth. The fine material, such as the hulls and portions, are removed by the rotating saws, and carried between the ribs 37, while the whole cotton seed cannot pass between these ribs. The whole seeds work toward the bottom and not being able to pass thru the center of comb 60 gradually feed longitudinally over the said comb, toward the ends thereof, and discharge through the large openings between the teeth 62, at or near the ends of the comb. The cut hulls being held in the roll cannot fall upon the comb but must be removed by the revolving saws, and are thrown by centrifugal force into the saw chamber 20, any of such material which may remain upon the saws, is partly or wholly removed by the incoming blast of air through the opening 35. The hulls or the like pass downwardly through the discharge chute into the trunk 78, and hence into and through the rotatable fan, and then discharge to the trunk and to the grinding mill. Any solid particles, such as bits of iron or broken parts of the machine, cannot escape the conical guard 82 and hence are caught within the trunk. Air may be admitted to the opening 80, in accordance with the adjustment of the opening 81. While the hulls are held in the roll it is obvious that a small percentage will pass thru the comb with the whole seeds. The whole seeds after being discharged from the machine are returned to the huller and rerun.

It is to be understood that the form of our invention herewith shown and described is to be taken as a preferred example of the same, and that various changes in the shape, size, and arrangement of parts may be resorted to without departing from the spirit of our invention, or the scope of the following claims.

Having thus described our invention, we claim:—

1. In a machine for separating and delinting cotton seed or the like, a frame, a roll-box carried thereby, a rotatable presser cylinder arranged eccentrically within the roll-box and provided with longitudinally spaced radially extending fingers, means for feeding cotton seed or the like into the roll-box, a grate embodying spaced bars, arranged at the lower portion of the roll-box, a rotatable saw cylinder embodying spaced saws having their upper portions operating between the grate bars and projecting into the lower portion of the roll-box, and means to drive the presser cylinder and saw cylinder.

2. In a machine for separating and delinting cotton seed or the like, a frame, a roll-box carried thereby, a rotatable presser cylinder arranged eccentrically within the roll-box and provided with longitudinally spaced radially extending fingers, means to feed material into the roll-box, a grate embodying spaced bars arranged at the lower portion of the roll-box, a rotatable saw cylinder arranged upon the lower side of the grate and embodying spaced saws having their upper portions extending between the grate bars and projecting above the same to enter the roll-box, means to drive the pressed cylinder and saw cylinder, and a saw chamber inclosing the saw cylinder.

3. In a machine for separating and delinting cotton seed or the like, a frame, a roll-box carried thereby, a rotatable presser cylinder arranged eccentrically within the roll-box and provided with spaced outwardly extending fingers, said fingers having their forward and rear edges converging outwardly to form radial tapered recesses between the fingers, said fingers also having their side faces converging forwardly for forming tapered recesses between the fingers in the same set, a grate arranged near and beneath the rotatable presser cylinder and embodying spaced bars, a rotatable saw cylinder embodying spaced saws arranged beneath the grate bars and projecting upwardly between the same and into the roll-box, and means to rotate the presser cylinder and saw cylinder.

4. In a machine for separating and delinting cotton seed or the like, a frame, a roll-box carried thereby, a rotatable presser cylinder arranged within the roll-box and provided with longitudinal sets of outwardly extending fingers, each finger having its forward and rear edges converging outwardly and its opposite side faces converging forwardly, a grate bar arranged near and beneath the rotatable presser cylinder and embodying spaced grate bars adapted to substantially register with said fingers, a saw cylinder arranged beneath the grate bar and embodying spaced saws having their upper portions arranged between the grate bars and projecting above the same, and means to rotate the presser cylinder and saw cylinder.

5. In a machine for separating and delinting cotton seed or the like, a frame, a roll-box carried thereby, a rotatable presser cylinder arranged within the roll-box and provided with longitudinal sets of outwardly extending fingers, each finger having its opposite side faces converging forwardly, a grate arranged near and beneath the presser cylinder and embodying spaced grate bars, a saw cylinder arranged beneath the grate bars and embodying saws having their upper portions projecting between the grate bars and above the same into the roll-box, and means to drive the presser cylinder and saw cylinder.

6. In a machine for separating and delinting cotton seed or the like, a frame, a roll-box carried by the frame, a presser cylinder having radial pockets for gathering cotton seeds and eccentrically mounted within the roll-box, a grate arranged at the lower portion of the roll-box and embodying spaced grate bars, a comb secured to the lower portion of the roll-box and embodying spaced teeth arranged adjacent the grate bars, a saw cylinder arranged beneath the grate bars and embodying saws projecting upwardly between the grate bars and comb teeth and entering the comb box, and means to drive the presser cylinder and saw cylinder.

7. In a machine for separating and delinting cotton seed or the like, a frame, a roll-box carried by the frame, a presser cylinder mounted within the roll-box, a grate arranged at the lower portion of the roll-box and embodying spaced grate bars, a comb secured to the lower portion of the roll-box and embodying spaced teeth arranged adjacent the grate bars, the spaces between said teeth increasing in width toward the ends of the comb, a saw cylinder arranged beneath the grate bar and embodying saws extending between the grate bars and teeth, and means to drive the presser cylinder and saw cylinder.

8. In a machine for separating and delinting cotton seed or the like, a frame, a saw chamber, a saw cylinder rotatable within the chamber and embodying spaced saws, a grate arranged at the upper portion of the saw cylinder and embodying spaced bars to receive the spaced saws therebetween, a revolving cylinder having radial pockets to compress the cotton seed and move the same into contact with the upper portions of the saws, a trunk arranged beneath the saw chamber and having communication therewith, and a rotary suction fan connected with the trunk.

9. A presser cylinder for a cotton seed separator comprising in combination with spaced revolving saws a rotatable shaft, a plurality of disks mounted fast on the shaft, and fingers extending radially from said disks and having their advance faces of less width than their following faces, whereby wedge shaped pockets are formed between the fingers of adjacent disks for receiving said saws.

10. A presser cylinder for a cotton seed separator comprising in combination with spaced revolving saws a perimeter having laterally spaced circumferential wedge shaped pockets having their broadest ends directed in the line of rotation of the cylinder and arranged to receive said saws.

In testimony whereof we affix our signatures.

HIGHLAND G. VARDELL,
*Executrix of Arthur A. Vardell, deceased.*
JAMES WYATT STRIBLING.